Dec. 11, 1923.
S. L. SMITH
ARTICLE OF MANUFACTURE
Filed May 10, 1922
1,476,732
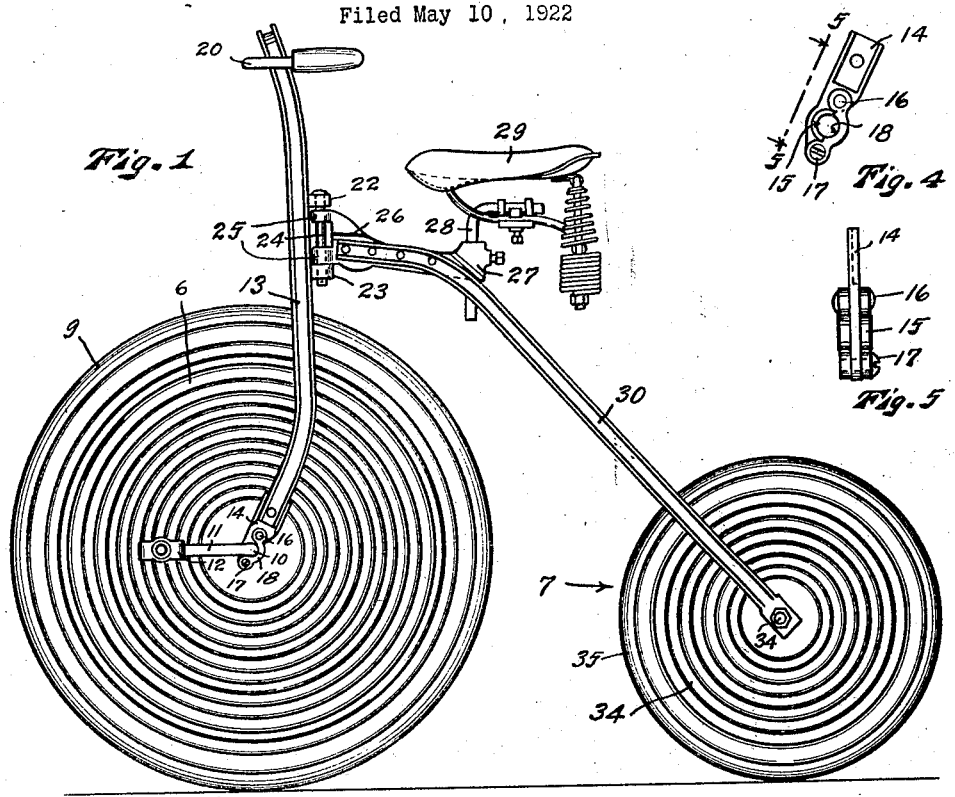
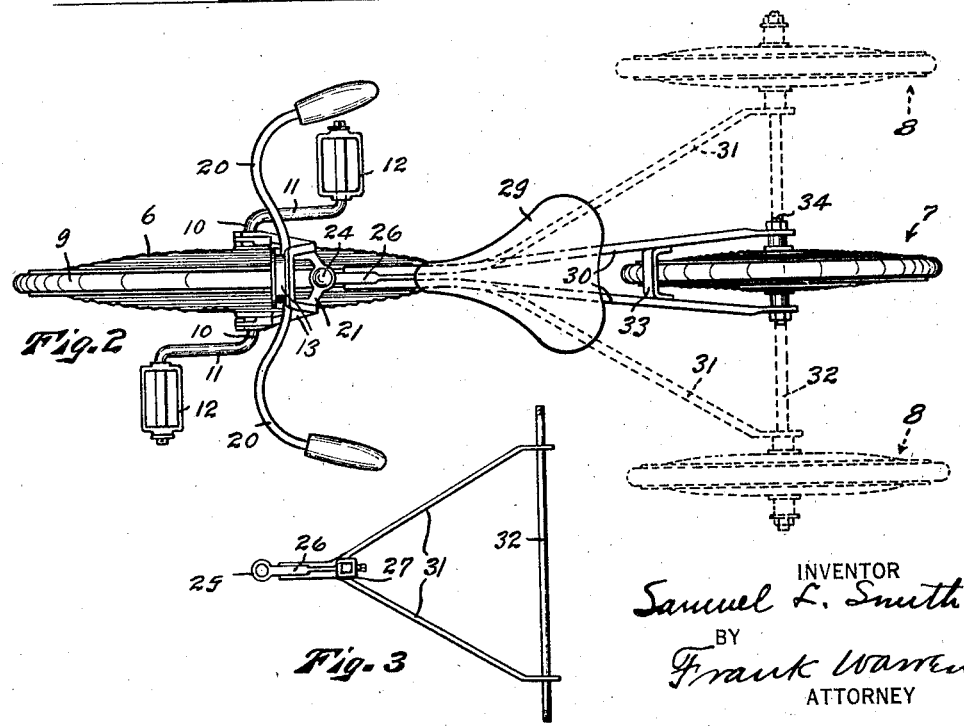
INVENTOR
Samuel L. Smith
BY
Frank Warren
ATTORNEY Patented Dec. 11, 1923.

1,476,732

UNITED STATES PATENT OFFICE.

SAMUEL L. SMITH, OF ELLENSBURG, WASHINGTON, ASSIGNOR TO SMITH MANUFACTURING CO., INC., OF ELLENSBURG, WASHINGTON.

ARTICLE OF MANUFACTURE.

Application filed May 10, 1922. Serial No. 559,709.

*To all whom it may concern:*

Be it known that I, SAMUEL L. SMITH, a citizen of the United States, residing at Ellensburg, in the county of Kittitas and State of Washington, have invented a certain new and useful Improvement in Articles of Manufacture, of which the following is a specification.

My invention relates to improvements in an article of manufacture and the object of my invention is to provide an article of manufacture comprising elements that may be quickly and easily converted into a bicycle or tricycle, said elements consisting of a front section, two rear sections and three disc wheels and a seat which sections, wheels and seat may be sold as a unit whereby the purchaser may either convert the article into a bicycle or a tricycle as desired.

Another object is to provide a readily convertible vehicle that is strong and durable in its plan of construction, that will withstand a great amount of rough usage and that is not expensive to manufacture.

A further object is to provide novel and readily releasable means for forming bearings for the pedal or crank shaft axles of the front wheel, said bearing means permitting the pedal cranks to be formed integral with the bearing shaft of the front wheel and further permitting bushings to be readily inserted in the event the bearings become worn.

Other and more specific objects will be apparent from the following description taken in connection with the accompanying drawings.

Referring to the drawings, Figure 1 is a view in side elevation of a vehicle constructed in accordance with my invention;

Fig. 2 is a plan view of the same, the bicycle attachment being shown by full lines and the tricycle attachment being shown by broken lines;

Fig. 3 is a detached plan view of a part of the tricycle attachment;

Fig. 4 is a detached view in elevation of one of the bearings for the front wheel, and Fig. 5 is a view in elevation on line 5, 5 of the device shown in Fig. 4.

In the drawings throughout which like reference numerals designate like parts, I have shown a vehicle, which, when it is used as a bicycle, comprises in part a front wheel 6 and a rear wheel 7 and which, when it is used as a tricycle, comprises in part the same front wheel 6 and two spaced apart rear wheels 8 that are similar to the rear wheel 7.

The front wheel 6 is preferably formed of two concavo-convex metal discs that are provided with circumferential corrugations and that are rigidly secured together with their concave sides adjacent to each other so that they form a wheel, the greatest width of which is at the location of the hub. The peripheral portions of the discs are bent to form an annular channel for the reception of a tire 9 preferably of rubber or like resilient material.

Extending through the axial portion of the front wheel and rigidly secured thereto is a bearing shaft 10 that is bent on opposite sides of the wheel to form crank shafts 11 whereon are provided pedals 12.

13 is a combined fork and steering post formed of a single piece of channel shaped metal bent double and of substantially the shape shown in Figs. 1 and 2. The fork 13 is provided at the lower ends with bearing members each formed of two separate pieces one of said pieces having a recessed upper portion 14 that is arranged to fit over and be securely riveted to the end of the fork and having a semi-circular bearing member 15 formed on its lower end and the other of said pieces being secured to the first named piece at its upper end by a pivot 16 and at its lower end by a screw 17 and having a semi-circular bearing portion 18 arranged opposite to and co-operating with the bearing member 15.

Removal of the screw 17 will permit the bearing member 18 to swing outwardly in an obvious manner so that the fork portion 13 may readily be connected with or detached from the front wheel. If the bearing becomes worn the screw 17 may be removed and bushing material as leather may be inserted to compensate for the wear.

The combined fork and steering post portion 13 is provided at the upper end with a rigid handle bar member 20 and is further provided just above the periphery of the wheel 6 with a bracket 21 that serves as a rigid cross brace or tie member between the two sides of said fork portion and that has rearwardly protruding upper and lower lugs 22 and 23 that are perforated for the reception of a vertical pin or bolt 24. The bolt 24 is also arranged to pass through perforated lugs 25 on the forward end of a bracket member 26 the lugs 25 being arranged to fit between the lugs 22 and 23 all as shown in Figs. 1 and 2, so that the bracket member is pivotally secured to the fork portion of the vehicle. The rear end of the bracket member 26 has an enlarged portion 27 for adjustably receiving a post 28 whereon a seat 29 may be mounted.

Secured to opposite sides of the bracket member 26 are two rearwardly protruding frame pieces, which may diverge slightly as do the pieces 30 shown by full lines in Fig. 2, to afford room for the single wheel 7 and to thereby form a bicycle, or which may diverge more widely as do the pieces 31, shown by broken lines in Fig. 2, and have at their rear ends a transverse axle 32 whereon may be mounted the two wheels 8 to form a tricycle.

The frame pieces 30 forming the bicycle attachment are preferably secured together just above the wheel 7 by a cross bracket 33 and the wheel 7 is mounted for rotation on a bearing pin 34 that extends crosswise through the ends of the frame pieces 30.

The rear wheels are all of identical construction and are formed in substantially the same manner as the larger front wheel from two concavo-convex discs 34 of circumferentially corrugated metal that are provided with a peripherally disposed tire 35 of rubber or similar resilient material.

The vehicle is offered for sale as a unit including one of the rear tricycle frame parts and one of the rear bicycle frame parts and either two or three of the rear wheels.

The vehicle may be readily converted from a bicycle to a tricycle or vice versa by removing one rear part and attaching the other. One seat and two rear wheels may be made to fulfill the requirements of both attachments if desired.

The device is primarily intended for the use of children as a plaything and is especially attractive for the reason that it enables the owner to have either a bicycle or a tricycle at will for only a slight cost in excess of the price of either one singly.

From the foregoing description taken in connection with the accompanying drawings the advantages of the construction and of the method of operation of my device will be readily apparent to those skilled in the art to which my invention relates, and while I have described the principle of operation of my invention together with the device which I now consider to be the best embodiment thereof, I desire to have it understood that the device shown is merely illustrative and that such changes may be made when desired as are within the scope of the invention.

What I claim is:

An article of manufacture comprising, a seat, a front section having means for attaching a large wheel, a rear section having means for attaching two small wheels, another rear section having means for attaching one small wheel, one large wheel and two small wheels, means on said front section adapted to receive either one of the rear sections, means on said two rear sections for receiving said seat, means on said front section for receiving said large wheel, means upon one of said rear sections for receiving said two small wheels and means on the other rear section for receiving one of said two small wheels.

In witness whereof, I hereunto subscribe my name this 5th day of May, A. D. 1922.

SAMUEL L. SMITH.